No. 641,183. Patented Jan. 9, 1900.
J. B. BLISH.
INSTRUMENT FOR MEASURING ERRORS IN TARGET PRACTICE.
(Application filed Apr. 15, 1898.)
(No Model.) 2 Sheets—Sheet 1.
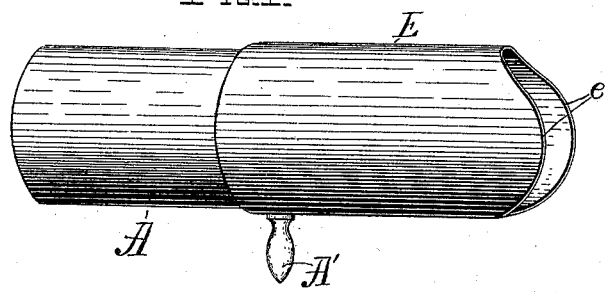
Fig. 1.
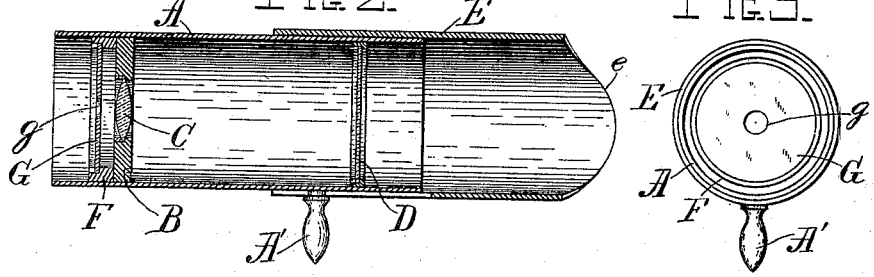 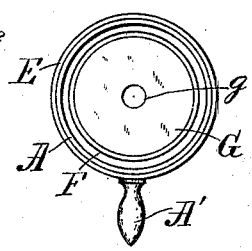
Fig. 2. Fig. 3.
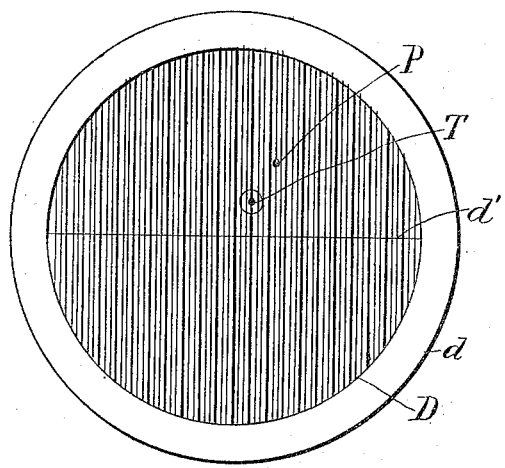 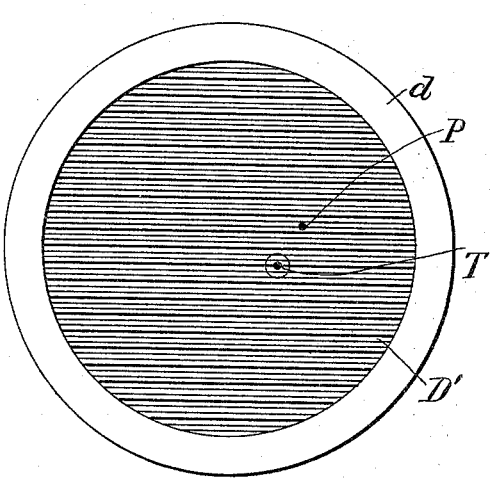
Fig. 4. Fig. 5.
Witnesses
John N. Holt
Percy C. Bowen
Inventor
John B. Blish,
Wilkinson & Fisher,
Attorneys.
THE NORRIS PETERS CO., PHOTO-LITHO., WASHINGTON, D. C.

No. 641,183. Patented Jan. 9, 1900.
J. B. BLISH.
INSTRUMENT FOR MEASURING ERRORS IN TARGET PRACTICE.
(Application filed Apr. 15, 1898.)
(No Model.) 2 Sheets—Sheet 2.
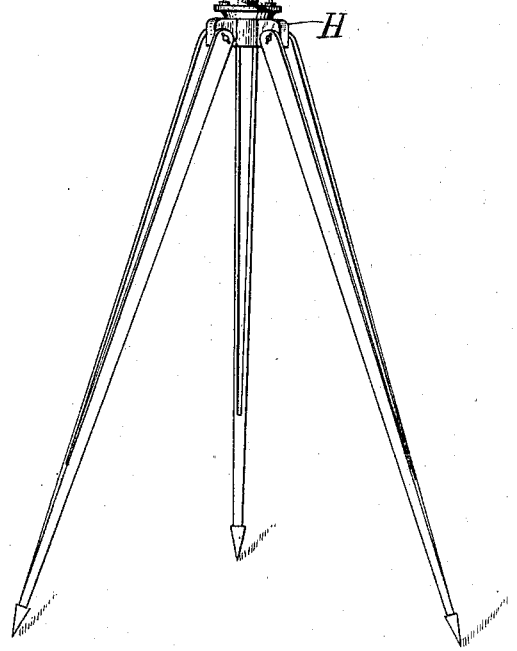
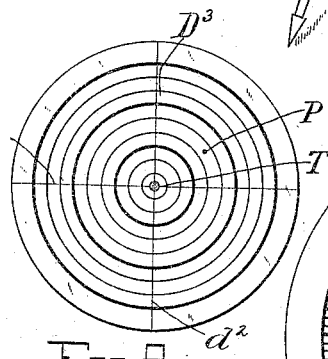
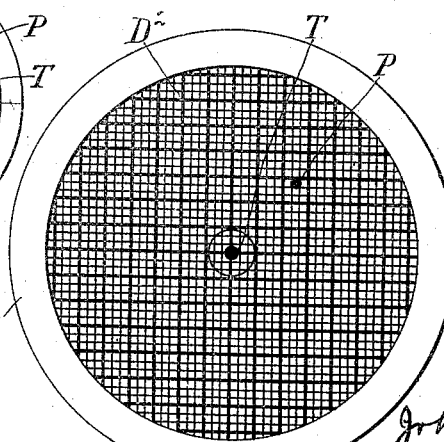
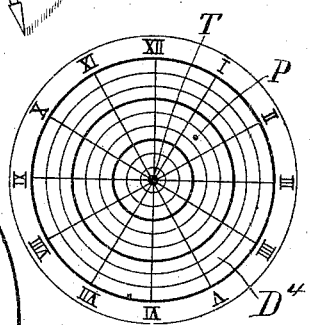
Witnesses
John N Holt
Percy C Bowen
Inventor
John B. Blish,
by Wilkinson + Fisher
Attorneys.
THE NORRIS PETERS CO., PHOTO-LITHO., WASHINGTON, D. C.

UNITED STATES PATENT OFFICE.

JOHN B. BLISH, OF THE UNITED STATES NAVY.

INSTRUMENT FOR MEASURING ERRORS IN TARGET PRACTICE.

SPECIFICATION forming part of Letters Patent No. 641,183, dated January 9, 1900.

Application filed April 15, 1898. Serial No. 677,725. (No model.)

*To all whom it may concern:*

Be it known that I, JOHN B. BLISH, lieutenant in the United States Navy, serving on board United States steamer *Michigan*, have invented certain new and useful Improvements in Instruments for Measuring Errors in Target Practice; and I do hereby declare the following to be a full, clear, and exact description of the invention, such as will enable others skilled in the art to which it appertains to make and use the same.

My invention relates to instruments for use in target practice, and is intended to provide an instrument or a pair of instruments by means of which the striking of the projectile may indicate the relative distance from the target or other object aimed at.

For use aboard ships, on boats, or where the platform of the observer is unsteady or where time is pressing the observations are preferably taken by two independent observers; but where the instrument may be fixed on the target and held with its axis pointed in the same direction a single instrument and a single observer may be employed.

The said invention may be understood by reference to the accompanying drawings, in which the same parts are indicated by the same letters throughout the several views.

Figure 1 represents a perspective view of one form of instrument used by one of the two observers. Fig. 2 represents a section through the axis of the instrument shown in Fig. 1. Fig. 3 represents an end view of the instrument as seen from the left of Figs. 1 and 2. Fig. 4 represents, on an enlarged scale, a ground-glass plate having parallel and vertical lines ruled thereon for use in determining the horizontal angle of the error of the projectile; and Fig. 5 represents a similar view of a similar ground-glass plate with horizontal lines ruled thereon to determine the vertical angle or error of the projectile. Fig. 6 represents one form of instrument mounted on a tripod and adapted for use on shore; and Figs. 7, 8, and 9 represent other forms of the ground-glass plates adapted for use with the device shown in Fig. 6.

A represents a telescopic tube having the diaphragm B mounted therein, in which is held the convex lens C, which focuses an image of the target and of the water, land, or other objects surrounding the same onto the ground-glass plate D.

E represents the sliding hood, of rubber, leather, or other suitable material, made to cut off the lateral rays of light from the eyes of the observer and to enable the observer to see distinctly the inverted image on the plate D. Any suitable hood may be substituted for the sliding hood E, if desired.

Either the tube A or hood E may be provided with a handle A' of any convenient shape, if desired, or this handle may be omitted. The lens C will show an inverted image on the ground-glass plate D; but should it be desired to show the image in its proper position this may be done by the addition of the rectifying optical magnifying-glasses well known in spy-glasses, telescopes, &c.; but for simplicity of construction and to avoid errors it is preferable to use the single lens showing an inverted image.

In order to regulate the amount of light on the lens C, I provide a ring F in front of the diaphragm B, in which is inserted a diaphragm G, with an aperture $g$; but any form of adjustable stop, such as is well known in photography, may be used for this purpose. Where the light is dim, it would be preferable to omit the entire diaphragm G or open the stop wide. The interior of the tube A and hood E should be blackened to prevent the interference of light-waves.

The plate D, with the vertical lines, is mounted in the ring $d$, which is secured in the tube A, as indicated in Fig. 2. The plate D' differs only from the plate D in that the lines are horizontal instead of vertical, and it will be obvious that the two instruments might be made exactly alike and the one held with the lines vertical, as shown in Fig. 4, and the other with the lines horizontal, as shown in Fig. 5, and thus the horizontal and vertical angles of error of the projectile could be determined by independent observers.

The inner face of the plate D is ground like the glass face of a photograph-camera and has lines accurately ruled upon it. The lines should preferably be equidistant and for noting angular errors to the right or left or "short" or "over" should preferably be partly composed of equidistant heavy lines and with light lines ruled between the heavy lines. As a further assistance to accurate measurements I prefer that there should be two light lines between each pair of heavy lines, that the heavy lines should be twice the width of the light lines, and that the spaces between each pair of lines should be twice the width of the heavy lines. In this manner an observer can note the angle of the error by lines and spaces that the projectile strikes to the right or left of the target or short or over the target, and a sharp eye may observe the angular distance to even a fraction of the thickness of one of the finer lines.

In use the hood E is adjusted at the proper distance for the observer to best see most clearly the lines on the plate. As constructed the hood has edges $e$ so shaped as to fit snugly against the forehead and over the nose and to protect the plate from lateral rays of light.

The instrument shown in Figs. 1 and 2 is held in both hands, pressing the edges of the hood against the forehead; but it may be mounted on any suitable stand. On looking at the plate there will be seen the black lines on the plate and the inverted image of the landscape. The target is brought near the center of the plate, and as the projectile strikes near it the splash P is plainly seen, and the number of lines and spaces between the splash and nearest end of the target can be counted, which with the plate used in the position shown in Fig. 4 would determine the horizontal angle of error of the projectile and with the plate shown in Fig. 5 would determine the vertical angle of error of the projectile. Thus the plate shown in Fig. 4 would indicate the angle to which the projectile strikes to the right or left and that shown in Fig. 5 would indicate the angle the projectile strikes short or over.

In order to insure that the lines are vertical when in use, the plate shown in Fig. 4 may be provided with one or more horizontal lines $d'$, which can be held parallel to the horizon. By having two independent observers these two observations could be noted down and reduced to angles or to distance by any one skilled in the art. In order to note the errors short or over where the target is at any considerable distance—say over five hundred yards—the observer with the horizontal plate $D'$ should be in an elevated position, as in a military top, and the proper connections applied, as will be hereinafter described. The foregoing angles, either vertical or horizontal distances from the splash to the target and the fall of the projectile, can be platted on a vertical plane.

Where the platform is steady, as on shore, and the target fixed, the two plates may be combined into one, as shown in Fig. 7, and may be included in a single instrument, as shown in Fig. 6, where the tube A is mounted on a suitable tripod H and the target is brought to the center of the plate, as shown in Fig. 7. Then the point at which the projectile P strikes the target or splashes the water or strikes the dust or the shell explodes may be directly read off, as at P, and horizontal and vertical errors may be simultaneously noted from the same instrument. In this form of instrument an image of the target can be drawn on the ground-glass plate, as with a pencil, which image may be caused to be concentric with the target itself, and thus the position of the point at which the projectile strikes may be compared with the drawing instead of the target. This would be specially desirable where only one point, as a light on the target, is feasible, whose relation to the target was known to the observer. Instead of the form of plate shown in Figs. 4, 5, and 7 the lines may be made in the form of a series of concentric circles, as shown in Fig. 8, and these concentric circles may be cut by radial lines at equal angles with each other, as shown in Fig. 9, from which figure the distance from the bull's-eye and the angle from the vertical to the horizontal may be quickly read off by a single observer. Lines $d'$ and $d^2$, intersecting at right angles, are preferably added to the circles shown in Fig. 8, so that the instrument may be laid with one of the lines horizontal or vertical, as may be most convenient, and then vertical and horizontal angles may be estimated by the eye.

In the form of plate shown in Fig. 9 I have indicated the position of the hours on the dial of a watch or clock, so that the instrument may be used in noting target practice at a bull's-eye target in the ordinary way. This form is preferable for small-arm practice at a fixed target and from a fixed platform.

For long-range firing the horizontal angles need no correction; but the vertical angles should be corrected for the curve of the trajectory, and the short and over angles must be referred to the horizontal plane first and then transferred to the vertical plane by means of the well-known "Tables for Gun Practice" or in any convenient way. It will be obvious that the image on the plate may be magnified or rectified, or both magnified and rectified, by any suitable arrangement of lenses interposed between the plate and the eye.

While I have shown various forms of the instrument, I do not mean to in any way limit my invention to the precise forms described and shown, as a great many variations might be made in the apparatus which could be used without departing from the spirit of my invention.

Having thus described my invention, what I claim, and desire to secure by Letters Patent of the United States, is—

1. An instrument for noting errors in target practice, comprising a tube, a lens held in said tube, a ground-glass plate with lines thereon in regular order arranged in the focus of said lens, the end of said tube beyond the ground-glass plate being left open for the observer, substantially as described.

2. An instrument for noting errors in target practice, comprising a lens, a ground-glass plate with equidistant lines shown thereon, arranged in the focus of said lens, and an opening for observing said plate from the side opposite said lens, substantially as described.

3. An instrument for measuring errors in target practice, comprising a tube, a translucent plate mounted in said tube with a series of equidistant lines shown thereon, and means for throwing an image of the target and objects surrounding the same upon the said plate whereby the relative bearing of the target and the point of impact of the projectile may be noted, substantially as described.

In testimony whereof I affix my signature in presence of two witnesses.

JOHN B. BLISH.

Witnesses:
W. L. VARNUM,
F. H. WATSON.